Sept. 11, 1951 F. G. LESNIAK 2,567,219
PLURAL INTERMESHING FEED OR PRESS SCREWS
Filed Feb. 12, 1945 5 Sheets-Sheet 1

INVENTOR
FRANK G. LESNIAK
BY
ATTORNEY

Sept. 11, 1951 F. G. LESNIAK 2,567,219
PLURAL INTERMESHING FEED OR PRESS SCREWS
Filed Feb. 12, 1945 5 Sheets-Sheet 2

INVENTOR
FRANK G. LESNIAK
BY
ATTORNEY

Sept. 11, 1951 F. G. LESNIAK 2,567,219
PLURAL INTERMESHING FEED OR PRESS SCREWS
Filed Feb. 12, 1945 5 Sheets-Sheet 3
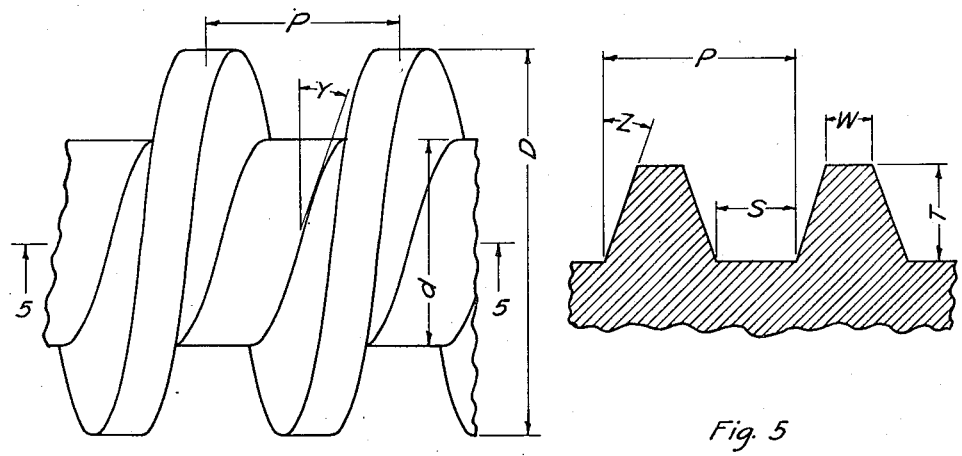
Fig. 4
Fig. 5
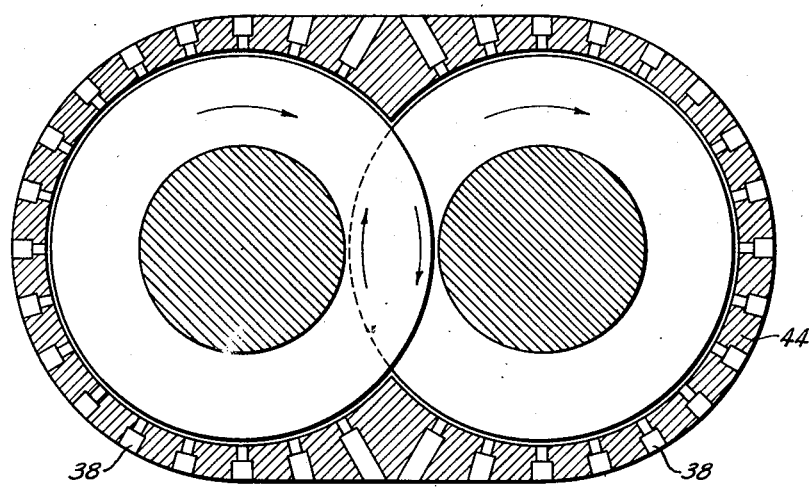
Fig. 3
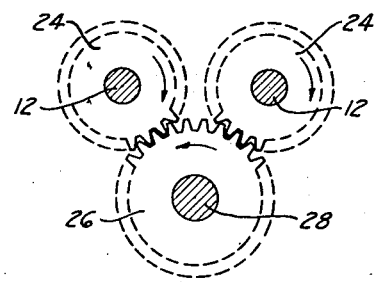
Fig. 9
INVENTOR
FRANK G. LESNIAK
BY
ATTORNEY

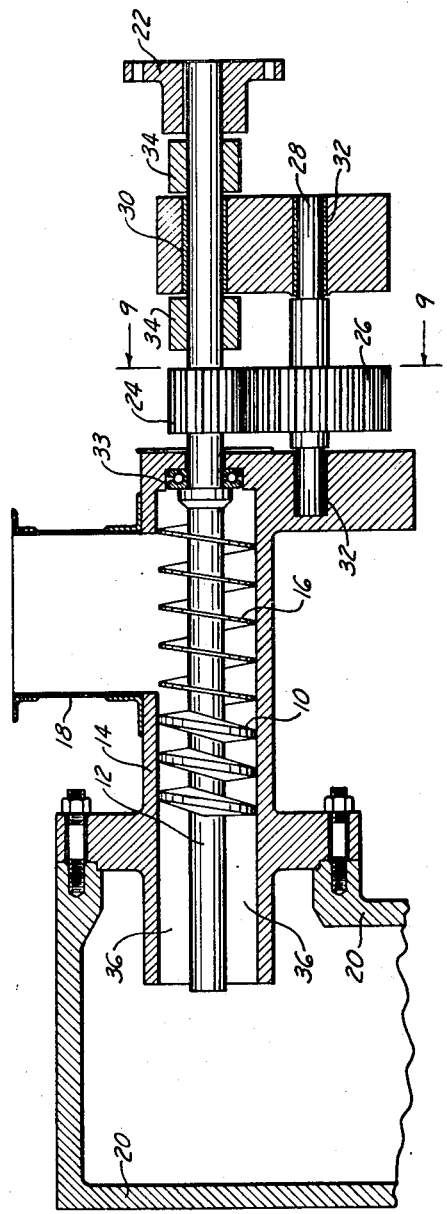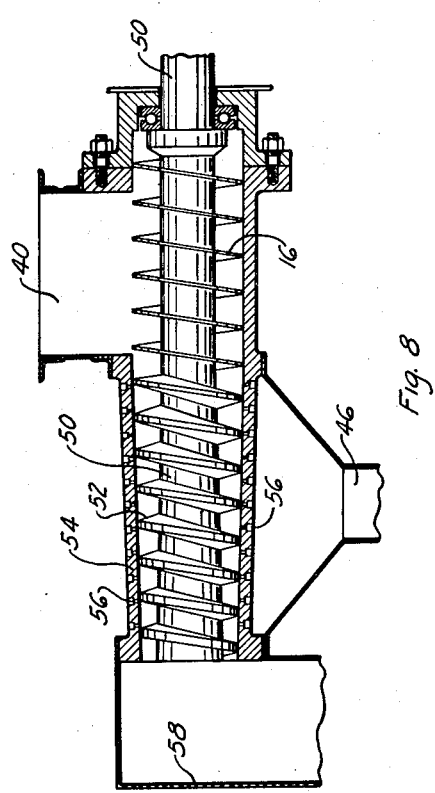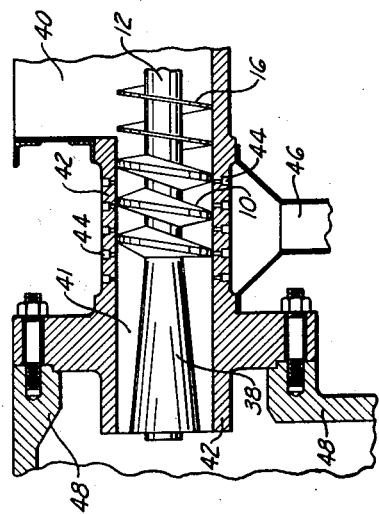

Sept. 11, 1951     F. G. LESNIAK     2,567,219
PLURAL INTERMESHING FEED OR PRESS SCREWS
Filed Feb. 12, 1945     5 Sheets-Sheet 5
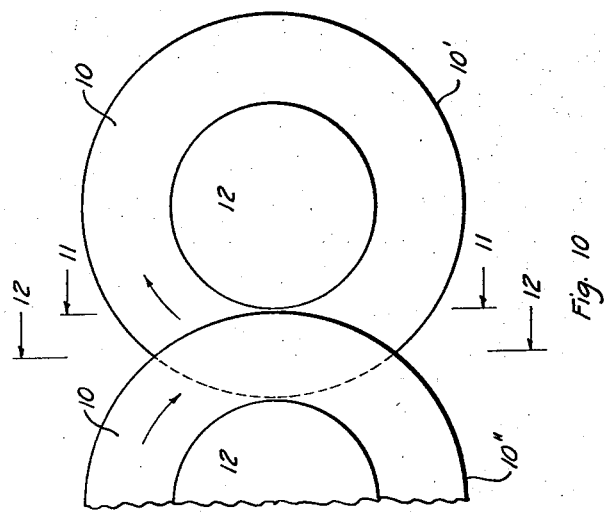
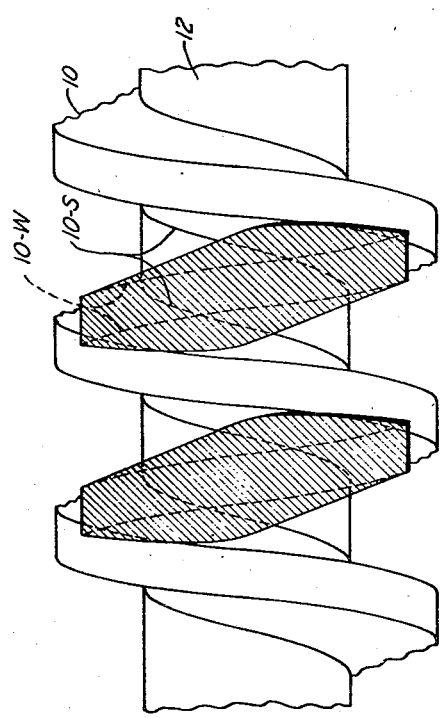
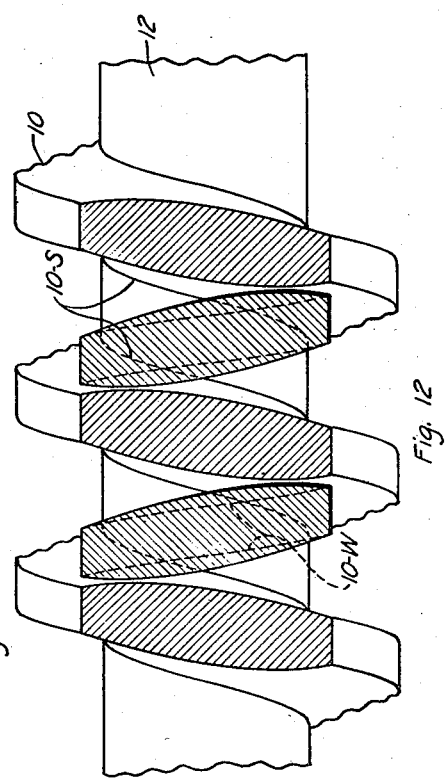
INVENTOR
FRANK G. LESNIAK
BY
ATTORNEY Patented Sept. 11, 1951

2,567,219

UNITED STATES PATENT OFFICE 2,567,219

PLURAL INTERMESHING FEED OR PRESS SCREWS

Frank G. Lesniak, Laurel, Miss., assignor to Masonite Corporation, Laurel, Miss., a corporation of Delaware Application February 12, 1945, Serial No. 577,378

5 Claims. (Cl. 100—48)

This invention relates to improvements in conveying and pressing apparatus. It relates especially to such apparatus including intermeshing screws which are rotated in the same direction and have critical relationships of thread angles and dimensions that impart good meshing and fitting properties while permitting such rotation and the consequent opposite movement of the meshing parts of the respective screws.

Intermeshing screws turning in the same direction have heretofore been proposed, but with no disclosure or embodiment of the critical factors which I have found to be essential.

The apparatus in which the intermeshing screws are used must generally be designed in accordance with the use to which it is to be put. The embodiment shown in Fig. 1 is useful in conveying material efficiently against high opposing pressure, as for example in feeding material against high steam pressure as described in Patent No. 1,922,313 and issued August 15, 1933, to Mason. In a modified form, as shown in Fig. 2, the apparatus is useful in expressing liquid from liquid-containing material, as for example pressing liquid from fiber stock, or other vegetable and animal materials, and the like.

The invention has for an object the provision of intermeshing screws, which turn in the same direction and are so constructed that they mesh without binding or undue leakage, and the material being acted upon will be efficiently moved against opposing pressure by the rotation of the screws, with low power consumption and without the material turning with the screws. It is also an object of the invention to provide intermeshing screws to rotate in the same direction and having critical relationships of angles and dimensions such that their respective meshing portions which move in opposite directions will neither bind by too close engagement nor provide openings detrimental to efficient conveyance of material by the rotary screws against opposing pressure. A further object is to provide an expressing apparatus including tapered intermeshing screws with increasing shaft diameter and decreasing outside thread diameter, whereby the volume of the space between successive threads decreases towards the outlet and increasing pressure is applied to the material through reduction of its volume as it is moved toward the outlet. Additional objects of the invention will be apparent from the following description.

The invention is illustrated in several embodiments in the drawings wherein:

Fig. 3 is a sectional view on line 3—3 of Fig. 2.

Fig. 4 is a partial plan view of one of the screws illustrated in Fig. 1.

Fig. 5 is a partial sectional view of the thread profile on line 5—5 of Fig. 4.

Fig. 6 is a sectional view of an apparatus embodying intermeshing screws adapted to convey materials against high pressure.

Fig. 7 is a fragmentary sectional view of an apparatus including intermeshing screws and compression cones to remove liquid from material containing liquid.

Fig. 8 is a fragmentary sectional view of an apparatus embodying tapered intermeshing screws adapted to convey materials and simultaneously press the materials to remove liquid therefrom.

Fig. 9 is a view on line 9—9 of Fig. 6 showing gear arrangement to drive the intermeshing screws in the same direction.

Fig. 10 is an end view of two intermeshing screws with a portion of one of the screws broken away.

Fig. 11 is a sectional view on section line 11—11 of Fig. 10, and showing the opposite inclinations of the intermeshing portions of the screw threads of the respective screws of a pair; and Fig. 12 is a sectional view on section line 12—12 of Fig. 10.

Figure 1:
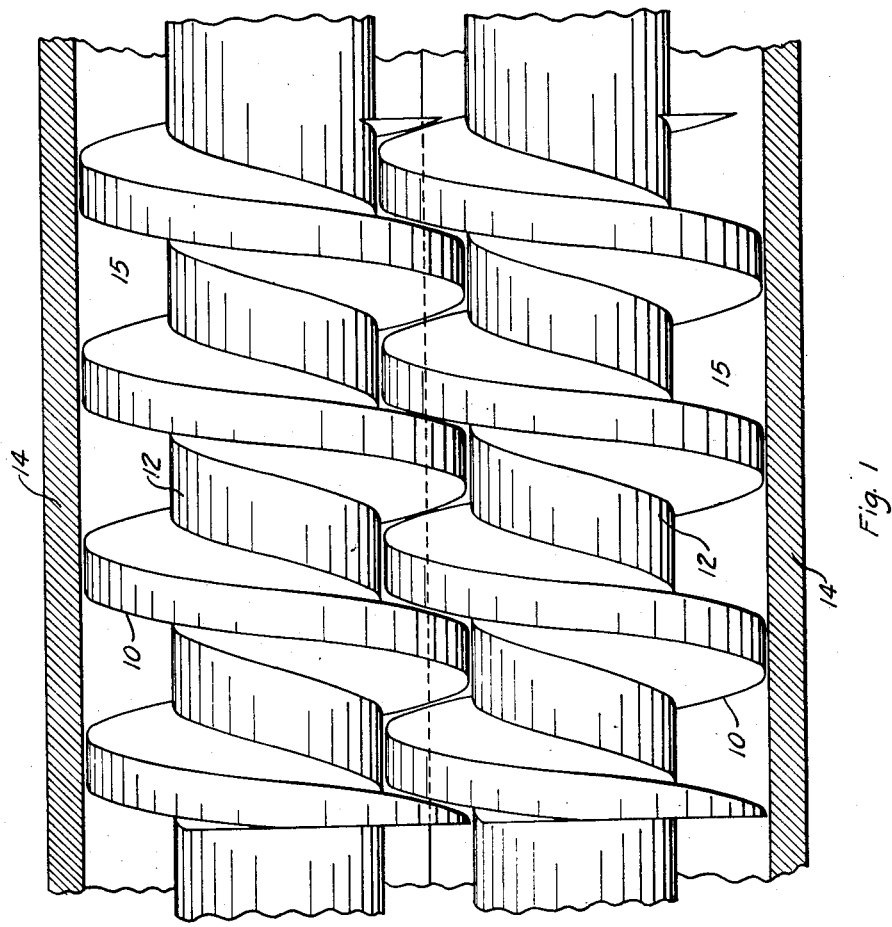
Fig. 1 is a plan view of intermeshing screws with spiral threads which are suitable for conveying material against pressure.

With both screws of an intermeshing pair of like screws rotated in the same direction, their respective parts in the intermediate meshing region move in opposite directions (see Figs. 3 and 10), and the portions of the threads which pass one another in such movement are of opposite inclinations (see Figs. 11 and 12).

I have discovered that under these circumstances, proper meshing, without binding or leaving openings detrimental to the forcing of materials against opposing pressure, can be attained only by having two critical relationships, one a relationship of angles and the other of dimensions.

Some of the screw dimensions are, of course, selected in accordance with performance requirements, volume of materials to be handled, rate of handling, nature and fineness-degree, viscosity, etc., of materials to be handled, pressure conditions which are to be met, and the like. These preliminarily-fixed dimensions ordinarily include the outside diameter of the screw, the diameter at the root or base of the thread, and the pitch of the screw, designated D, d, and P respectively in the following table.

In Figs. 4 and 5, the parts and angles of the screw are designated as follows:

D is the outside diameter of the screw.
d is the root or shaft diameter of the screw.
P is the pitch or lead of the screw.
W is the width of the thread at its crest, that is, at the outside diameter of the screw.
S is the distance between the threads at root diameter.
T is the depth of the thread.
Y is the angle of advance at root of thread, that is, the angle made by a tangent to the helix of the thread at root diameter with a plane perpendicular to the axis of the screw.
Z is the slant angle of the thread, that is, the angle made by the side of the thread with a plane perpendicular to the axis of the screw.

With $d$ and $P$ known, angle Y is determined by the following conventional equation:

$$\text{Tangent angle } Y = \frac{P}{d \times 3.1416}$$

The first of the critical relationships which I have discovered relates to angles and is that angle Z must exceed angle Y by at least 30 minutes of arc, and may exceed angle Y to any greater extent than this so long as the ratio of width of screw threads at crest W to the distance between the threads at root diameter S is kept within limits hereinafter stated.

This relationship may be expressed with symbols as follows:

Angle $Z$ = angle $Y$ plus at least 30 minutes

With angle Y determined as described above, an angle Z suitable for the purposes of the invention can be arrived at by addition of 30 minutes of arc or more to angle Y. The addition of 30 minutes to about 60 minutes is ordinarily preferable.

The second of the two coexistent critical relationships which I have found essential relates to thread dimensions and is that the ratio of the width of the screw thread at the crest W to the distance between threads at the root diameter S shall be more than 55:100 and less than 65:100, and preferably be approximately 60:100 or 3:5. This relationship can be expressed as follows:

$W:S$ is over 55:100, under 65:100, and preferably about 60:100 or 3:5.

It is apparent from Figs. 4 and 5 that:

$$S + W = P - 2 \text{ tangent } Z \times T$$

And since angle Z is now known, and may be, for example, angle $Y + 30$ minutes, and T is obviously equal to $$\frac{D-d}{2}$$

the value of $S+W$ is expressible in terms of the now known quantities D, d, and P and tangent Z.

By solving the above equation for $S+W$, after having substituted in its right-hand part the equals for T and tangent Z, and a ratio equation, as for example $5W = 3S$, as simultaneous equations, specific values for W and S will be obtained corresponding to any particular embodiments of the critical relationships between angle Z and angle Y, and between S and W as above described.

Screws made to embody the above critical relationships will intermesh properly, and such intermeshing screws, when encased in suitable pressure resisting casings, as illustrated in the drawings, may be suitably used to convey materials against high opposing pressure or to press liquid from material containing liquid. The intermeshing screws are rotated in the same direction to drive the material worked on forward, the material will not turn with the screws, and solid materials will not be wedged between the meshing portions of the threads because in the meshing region the parts of the respective screws move in opposite directions as indicated in Figs. 3 and 10.

As already stated, the respective portions of the intermeshing parts of the threads of a pair of intermeshing screws are oppositely inclined or slanted in the region in which they mesh with one another. This oppositely-slanting relationship is shown in Figs. 11 and 12. In said views the dotted lines 10W, which slant to the left, define the width W at crest of the threads of screw 10' of Fig. 10, and the lines 10S, which slant to the right, define the width S of the space between screw threads of screw 10''. Fig. 12, which sections the intermeshing portions of the threads of screws 10' and 10'' through the middle, also shows how this slanting relationship is productive of relatively close engagement between the oppositely-moving, intermeshing thread portions of the respective screws 10' and 10'', notwithstanding the thread-crest portions are narrower than the interspaces between the threads at root diameter, with a preferred ratio between their widths of 3:5.

The intermeshing screws may be rotated at any speed required for the material to be handled, and smooth and efficient operation will be secured. If fluid material, as for example oil, is being conveyed by the intermeshing screws, speeds as high as 1800 R. P. M. or higher may be used. For continuously conveying wood chips into a gun against high pressure, as referred to above, lower speeds are desirable, as 100 R. P. M. or lower.

The casings used to house the screws are preferably made to fit closely within practical working tolerances to the outside contour of the intermeshing screws, which is substantially similar to the outline of the numeral 8, as shown in Fig. 3. Such close fit is preferred between the casing and the exterior of the screws to avoid any substantially continuous openings in the apparatus which would lower the efficiency in operation.

In Fig. 1, I have shown a plan view of a pair of intermeshing screws 10, 10 formed integral with shafts 12 and operating within casing 14. These screws are made to embody the critical relationships described above and are adapted for conveying solid or fluid material against opposing pressures. The material is moved forward in spaces 15, 15 between the threads, such spaces being separated from one another at the region in which the threads of the two screws mesh together.

Use of such intermeshing screws in an apparatus made to convey materials against high pressure is illustrated in Fig. 6. In addition to the integrally-formed pressure screw sections 10, conventional, screw-conveyor flights 16 are mounted on shafts 12 in the approximate area of the bottom of feed hopper 18. This feature is desirable in order to feed a larger volume of material to the intermeshing screw sections 10 and thereby obtain greater volumetic efficiency in moving the material into the region of high pressure, as for example 1000 p. s. i. steam pressure within the walls 20. Screw shafts 12 are rotated by a suitable source of power (not shown) through coupling 22 and suitable gears 24 and 26.

Shafts 12 and shaft 28 rotate in suitable bearings 30 and 32 respectively. Parallel shafts 12, upon which the intermeshing screws 10 are integrally formed, are rotated in the same direction by gear 26 as illustrated in Fig. 9. Shaft 12 is provided with thrust bearings 33 suitable to take the heavy thrust. Collars 34 are preferably provided on each side of bearing 30.

In operation, material, as for example wood chips, is charged into hopper 18, and the screw-conveyor flights 16 feed the material forward to the intermeshing pressure screws 10. Screws 10 rotate in the same direction and intermesh with each other with substantially little or no slack between them, and will convey the material forward into the region of high pressure. On starting up it is preferable that the pressure within the walls 20 be built up gradually so that a substantially dense plug of material (to act as packing) will be formed in space 36 between the end of screws 10 and the space within walls 20. This is desirable to prevent any substantial blowing back of the material. For example, when the feeding operation is started, the pressure within walls 20 may at the beginning be maintained at, say, 50 p. s. i. until a plug of material has been gradually formed in space 36 against the resulting compression. The pressure may then be gradually increased to, say, 300 p. s. i. and a more dense plug formed. The pressure may be finally increased to, say, 1000 p. s. i. and a dense plug of material finally built up, which together with the material packed behind it in the interthread openings will withstand at least 1000 p. s. i. back pressure. By causing screws 10 to exert a forward thrust pressure greater than the back pressure, the compressed material will be caused to move forward continuously.

The apparatus illustrated in Fig. 6 may be modified to convey material by means of intermeshing screws and at the same time serve to press liquid from liquid-containing material. In Fig. 7, I have shown a fragmentary sectional view of such a modification wherein the forward end of shaft 12 flares outwardly to form a cone 38. Screws containing such modifications are preferably placed in casings containing openings in order to remove liquid from the material conveyed.

In use, material containing liquid, for example tung nuts, is fed through hopper 40, in the conventional screw-conveyor flights 16 mounted on shaft 12 will move the material forward to the novel intermeshing pressure screws 10. The intermeshing screws 10, as stated above, will move the material forward against opposing pressure without the material turning with the screws. Material moved forward into space 41 from the area of intermeshing screws 10 will be subjected to pressure due to the decreasing space between the outer walls of cone 38 and the inner walls of casing 42. Liquid pressed from the material will flow through openings 44 in casing 42 and be collected through funnel 46 in suitable containers (not shown). The material from which the liquid has been pressed may be collected in the container 48.

Figure 2:
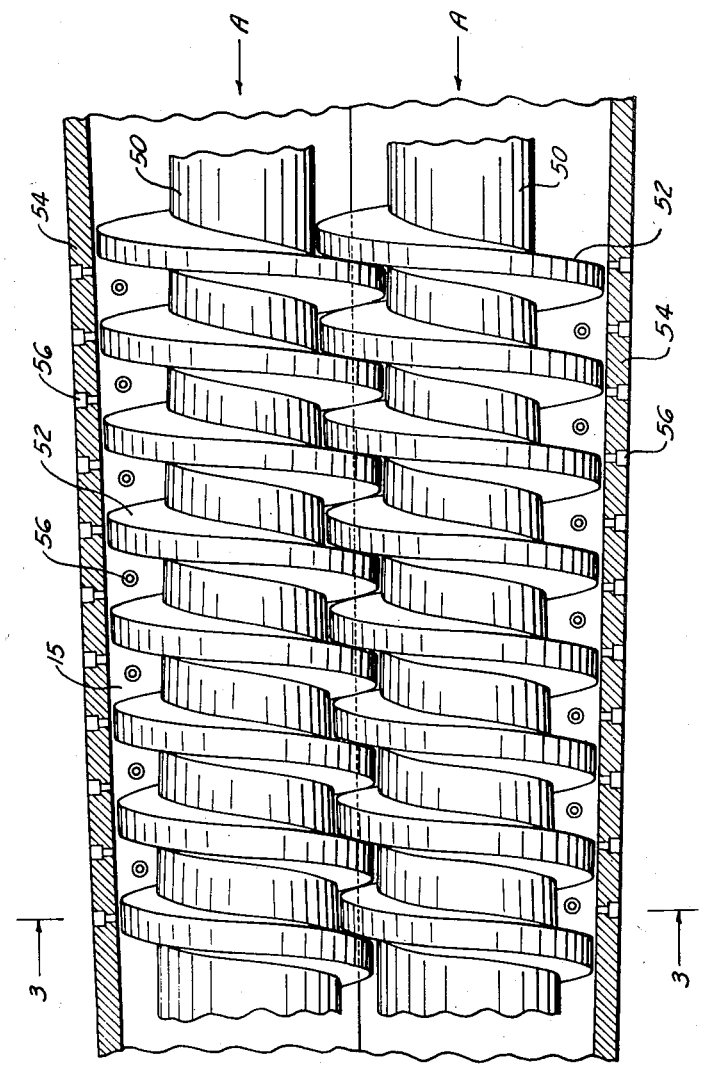
Fig. 2 is a plan view of tapered intermeshing screws adapted for expressing liquid from materials containing same.

In Fig. 2, a modified screw of taper formation is shown which is designed to press liquids from material containing liquid. The shaft portions and outer surface of such modified form of screw are tapered in opposite directions, and the depth of thread is greatest at the inlet end and decreases toward the outlet end so that a compressing action is exerted on material moved along by the screws in the direction of arrow A of Fig. 2.

Such tapered screws which rotate in the same direction and intermesh properly are preferably constructed as follows:

A screw of uniform outside diameter and with uniform depth of thread is first laid out in accordance with the critical relationships given above. Then a screw thread 52 is cut in a cylindrical blank of this outside diameter. This screw thread 52 is of the full depth of the layout at the right hand or inlet end, as shown in Fig. 2, but decreases in depth on a uniform taper toward the left hand or outlet end. The shaft portion 50 of the screw thus increases in diameter on a uniform taper toward the outlet end.

Next a uniformly-tapered cut, made with the same taper as before, is taken off the outside of the screw. This cut is so made that the screw retains subsequently the original diameter of the blank at the inlet end and gradually decreases in diameter to the outlet end. Thus the outside of the screw is tapered at the same angle as, but in the opposite direction from, the taper of the shaft portion 50. In this way the cross section of the space 15 between thread convolutions and close-fitting exterior casing 54 gradually decreases from inlet end to outlet end. Consequently, when material is fed into an apparatus comprising two such intermeshing screws as shown in Fig. 2, and the screws are rotated in the same direction, and the material moved by the screws in the direction of arrow A on Fig. 2, it will be subjected to predetermined gradual compaction, and liquid will be forced out of it to be drained through the spaced openings 56 in the wall of casing 54.

A small-size apparatus for expression of liquid, such as just described and shown in Fig. 2, and having a compaction ratio of about 3:1, may comprise intermeshing screws rotating in the same direction, with each screw having, for example, the following dimensions:

Length of screw: 9"
Outside diameter at inlet end: 3"
Outside diameter at outlet end: 2.33"
Taper of frusto-conical outer surface: 2°—7 minutes
Diameter of shaft portion at inlet end: 1"
Diameter of shaft portion at outlet end: 1.66"
Taper of shaft portion (opposite direction to just-named taper): 2°—7 minutes
Thread depth at inlet end: 1"
Thread depth at outlet end: .33"

Intermeshing tapered screws as illustrated in Fig. 2 are conveniently used in pressing apparatus shown in the fragmentary sectional view in Fig. 8. In such apparatus material containing liquid is fed to the pressing apparatus through hopper 40 and conventional screw-conveyor flights 16 mounted on shaft 50 will, upon rotation, move the material forward into the sections containing the intermeshing tapered screws. Since the depth of threads 52 decreases as the receiver portion 58 is approached, the material carried forward between the rotating intermeshing threads 52 will be subjected to pressure. The liquid pressed from the material will flow through casing openings 56 into funnel 46 and can be collected in suitable containers (not shown). The pulpy mass remaining after removal of liquid from the material is collected in receiver 58.

The apparatuses shown in Figs. 7 and 8 are especially suitable for use in extracting liquid from material in continuous operations with a high degree of efficiency. The intermeshing screws of the several figures rotate in the same direction and material moved forward by the screws will not rotate with the screws.

Further modifications can be made to contain intermeshing screws having the described critical relationships and will be embraced within the scope of the invention.

I claim:

1. A pair of intermeshing screws, integrally formed on parallel shafts, housed in a casing having an interior shape substantially similar to the outer contour of the intermeshing screws, and said screws being adapted to rotate in the same direction and capable of conveying material against high opposing pressures in the order of 1000 pounds per square inch without the conveyed materials rotating with the screws, said screws comprising threads having flat crests parallel to the shafts, the ratio of the width of the thread at the crest thereof to the distance between the threads at the root diameter being over 55:100 and under 65:100, and the angle made by the sides of the threads with a plane perpendicular to the axes of the screws being at least 30 minutes greater than the angles of the helices of the screws at the root diameter with a plane perpendicular to the axes of the screws.

2. An apparatus adapted for conveying material and capable of conveying material against high opposing pressures in the order of 1000 pounds per square inch which comprises a pair of intermeshing screws, adapted to rotate in the same direction, integrally formed on parallel shafts, and housed within a casing having an interior shape substantially similar to the outer contour of the intermeshing screws, said screws comprising threads having flat crests substantially parallel to the shafts, the ratio of the width of the thread at the crest thereof to the distance between the threads at root diameter being approximately 3:5, and the angle made by the sides of the threads with a plane perpendicular to the axes of the screws being at least 30 minutes greater than the angle made by the helices of the screws at the root diameter with a plane perpendicular to the axes of the screws.

3. An apparatus as defined in claim 2 which includes enlarged cone-shaped portions on the parallel shafts adjacent to the intermeshing screws and housed within the screw casing, said screw casing having a multiplicity of openings extending through the walls thereof.

4. A pair of intermeshing screws adapted to rotate in the same direction, said screws comprising threads integrally formed on parallel shafts having increasing diameter, with the exterior diameter of the screws decreasing in the same direction that shaft diameter increases, and the angle made by the sides of the threads with a plane perpendicular to the axes of the screws being at least 30 minutes greater than the angle made by the helices of the screws at the root diameter with a plane perpendicular to the axes of the screws.

5. An apparatus to convey material containing liquid and simultaneously press liquid therefrom, which comprises a pair of intermeshing screws adapted to rotate in the same direction and housed within a perforated casing having an interior shape substantially similar to the outer contour of the intermeshing screws, said intermeshing screws comprising threads integrally formed on parallel tapered shafts and with the exterior of the screw along the crests of the threads tapered at the same angle as the shafts but in the opposite direction to the taper of the shafts, and the angle made by the sides of the threads with a plane perpendicular to the axes of the screws being at least 30 minutes greater than the angle made by the helices of the screws at the root diameter with a plane perpendicular to the axes of the screws.

FRANK G. LESNIAK.

REFERENCES CITED

The following references are of record in the file of this patent:

UNITED STATES PATENTS

| Number | Name | Date |
|---|---|---|
| 1,631,119 | Collins | June 7, 1927 |
| 1,737,090 | Meyers | Nov. 26, 1929 |
| 1,777,250 | Blazer | Sept. 30, 1930 |
| 2,119,162 | Hartner | May 31, 1938 |
| 2,173,414 | Fulton | Sept. 19, 1939 |
| 2,360,984 | Schmitz, Jr. | Oct. 24, 1944 |

FOREIGN PATENTS

| Number | Country | Date |
|---|---|---|
| 109,663 | Great Britain | Sept. 25, 1917 |
| 310,625 | Italy | Aug. 28, 1933 |